A. BOHLIN.
VEHICLE WHEEL.
APPLICATION FILED DEC. 22, 1916.

1,219,369.

Patented Mar. 13, 1917.
2 SHEETS—SHEET 1.

WITNESSES

INVENTOR
A. Bohlin,
BY Victor J. Evans
ATTORNEY

A. BOHLIN.
VEHICLE WHEEL.
APPLICATION FILED DEC. 22, 1916.

1,219,369.

Patented Mar. 13, 1917.
2 SHEETS—SHEET 2.

WITNESSES

INVENTOR
A. Bohlin,
BY Victor J. Evans
ATTORNEY

UNITED STATES PATENT OFFICE.

ARVID BOHLIN, OF TRENTON, NEW JERSEY.

VEHICLE-WHEEL.

1,219,369.  Specification of Letters Patent.  Patented Mar. 13, 1917.

Application filed December 22, 1916. Serial No. 138,431.

*To all whom it may concern:*

Be it known that I, ARVID BOHLIN, a citizen of the United States, residing at Trenton, in the county of Mercer and State of New Jersey, have invented new and useful Improvements in Vehicle-Wheels, of which the following is a specification.

This invention relates to a vehicle wheel of the resilient type which is especially adapted for use upon motor vehicles, and the like.

The primary object of the invention is the provision of a wheel of this character which may be used as a tractor and in which, the inner ends of the spokes have connected therewith bands to encircle the wheel hub and having arranged therebetween cushioning members which, not only obviate the necessity of employing a pneumatic tire to absorb the shocks and jars incident to the travel of the wheel over an uneven surface, but permit lateral, as well as a slight circumferential movement of the wheel with relation to the hub.

With these and other objects in view, the invention resides in the novel combination and arrangement of parts, which will be hereinafter described and particularly pointed out in the claim.

The preferred embodiment of the invention has been illustrated in the accompanying drawings, although no restriction is necessarily made to the precise details of construction therein shown, as changes, alterations, and modifications, within the scope of the claim may be resorted to when desired.

In the drawings.

Like characters of reference denote corresponding parts throughout the several views in the drawings.

Figure 1:
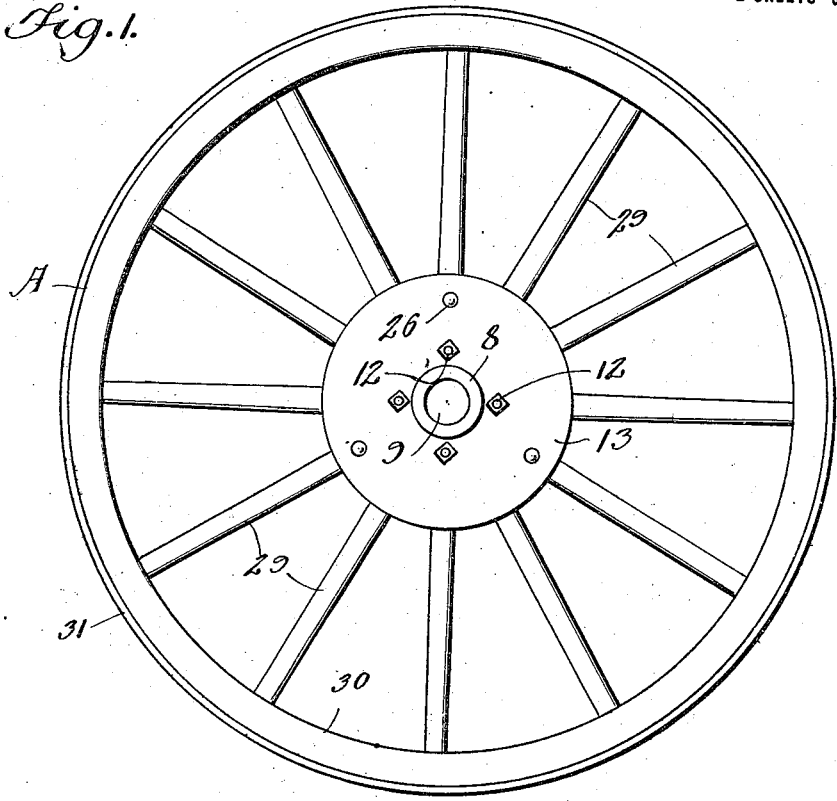
Figure 1 is a view in side elevation of a vehicle wheel constructed in accordance with the invention.
Figure 2:
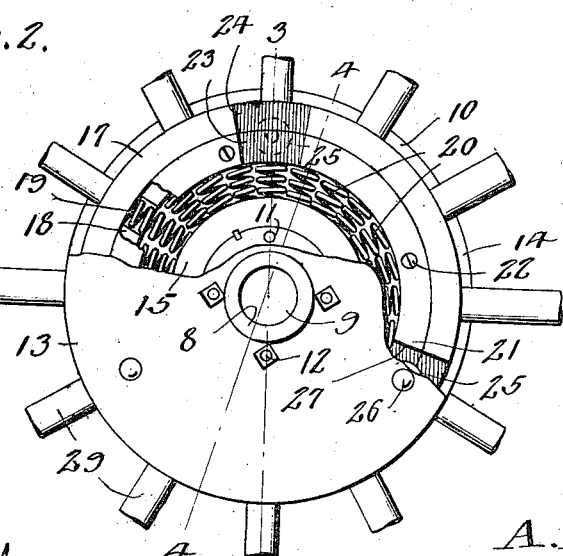
Fig. 2 is an enlarged side elevation of a portion of the wheel, with one of the hub plates broken away.
Figure 3:
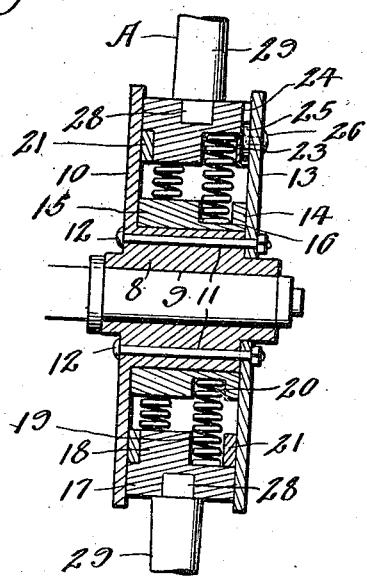
Fig. 3 is a vertical transverse section on the line 3—3 of Fig. 2.
Figure 4:
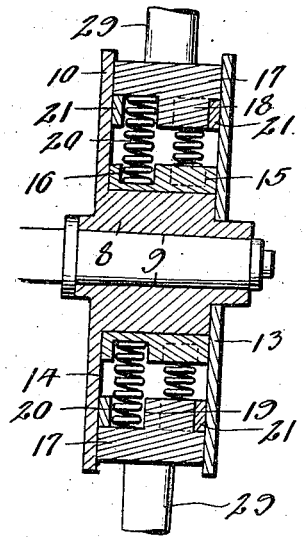
Fig. 4 is a section on the line 4—4 of Fig. 2.
Figure 5:
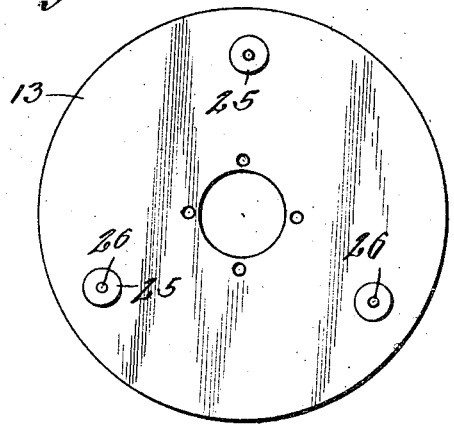
Fig. 5 is a view in elevation of one of the hub plates.
Figure 6:
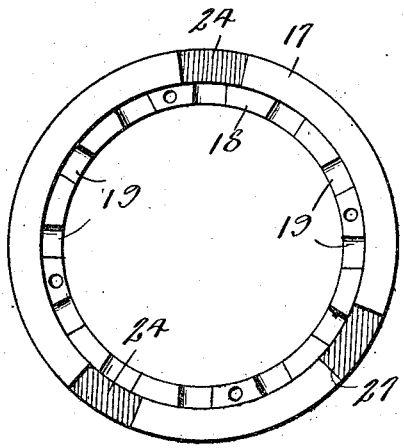
Fig. 6 is a view in side elevation of the band for connection with the spokes.

Referring now to the drawings in detail, the letter A designates the improved resilient wheel having the hub 8 provided with the usual spindle opening 9 and a circumferentially extending flange 10, said hub having formed therein transversely extending openings 11 through which pass bolts 12 connecting with the hub 8, a circular plate 13 coacting with the flange 10 in providing the hub with a channel 14.

A band 15 which may be keyed, or otherwise suitably fixed to the hub 8 is arranged in the channel 14 and has formed therein circumferentially extending rows of spaced openings 16, the openings in one of said rows being arranged intermediate the openings in the row adjacent thereto.

A band 17 arranged within the channel 14 to encircle the band 15 is provided on its inner face with a circumferentially extending flange 18, recessed upon opposite sides to form pockets 19 receiving therein the outer ends of coiled expansion springs 20 seated in the openings 16 in the band 15, and serving to space the band 17 from the band 15 and to permit lateral, as well as a slight circumferential movement of the band 17 with relation to the hub 8 when the wheel is in use.

Rings 21 for retaining the outer ends of the springs 20 in the pockets 19 are connected with the sides of the flange 20 by means of screws 22, with one of the said rings having formed in its outer face recesses 23 registering with recesses 24 in one side of the band 17, said recesses receiving rollers 25 mounted to turn on studs 26 on the plate 13 and engageable with the oppositely inclined walls 27 of the recesses 23 and 24 whereby, the band 17 will be caused to rotate with the hub 8.

The band 17 has formed therein openings 28 into which extend the tenons on the inner ends of the spokes 29 having connection with a felly 30 to which is secured a tire 31.

Through the provision of the recesses 23 and 24 in the band 17 and one of the rings 21 in which are received the rollers 25, it will be seen that the wheel may be advantageously employed as a tractor upon the rear axle of the motor vehicles, and that by dispensing with the recesses and rollers the wheel may be employed in connection with the front axle to absorb shocks and jars incident to the travel of the wheel over an uneven surface.

From the foregoing description, taken in connection with the accompanying drawings, it is at once apparent that a resilient wheel for vehicles has been provided which though

Having thus described the invention, what is claimed as new, is:

A vehicle wheel having a band fixed to the inner ends of the spokes and having recesses within one side thereof, a flange on the inner face of said band having openings within the sides thereof, rings secured to the sides of the flange and covering said openings, one of said rings having recesses therein registering with the recesses in the side of the band, a second band received in the first mentioned band and having openings therein, springs interposed between said bands and having ends received in said openings, a hub received in the last mentioned band and fixed thereto, a flange on said hub, a plate secured to said hub, and rollers on said plate received in the openings formed by the recesses in said ring and the first mentioned band.

ARVID BOHLIN. [L. S.]

Copies of this patent may be obtained for five cents each, by addressing the "Commissioner of Patents. Washington, D. C."